United States Patent
Liao et al.

(10) Patent No.: US 7,746,850 B2
(45) Date of Patent: Jun. 29, 2010

(54) INTERFACE CARD AND CTI SYSTEM APPLYING INTERFACE CARD

(75) Inventors: Yongkun Liao, Shenzhen (CN); Liangtian Wang, Shenzhen (CN)

(73) Assignee: Shenzhen Donjin Communication Tech Co., Ltd., Shenzhen (CN)

( * ) Notice: Subject to any disclaimer, the term of this patent is extended or adjusted under 35 U.S.C. 154(b) by 428 days.

(21) Appl. No.: 11/722,881

(22) PCT Filed: Jun. 30, 2006

(86) PCT No.: PCT/CN2006/001528

§ 371 (c)(1),
(2), (4) Date: Jun. 27, 2007

(87) PCT Pub. No.: WO2207/003132

PCT Pub. Date: Jan. 11, 2007

(65) Prior Publication Data

US 2008/0133805 A1 Jun. 5, 2008

(30) Foreign Application Priority Data

Jul. 4, 2005 (CN) .................. 2005 1 0035796

(51) Int. Cl.
*H04L 12/50* (2006.01)
*H04Q 11/00* (2006.01)
*G06F 13/12* (2006.01)
*G06F 13/38* (2006.01)

(52) U.S. Cl. .............. 370/366; 370/359; 370/360; 710/71; 710/66

(58) Field of Classification Search .......... 370/366, 370/359, 360; 710/71, 65
See application file for complete search history.

(56) References Cited

U.S. PATENT DOCUMENTS

| 5,073,779 | A * | 12/1991 | Skogmo et al. ........... 342/37 |
| 5,745,786 | A * | 4/1998 | Juall ............................ 710/9 |
| 6,388,591 | B1 * | 5/2002 | Ng ............................. 341/100 |
| 6,542,584 | B1 * | 4/2003 | Sherwood et al. ....... 379/88.18 |
| 2006/0282694 | A1 * | 12/2006 | Ichikawa .................. 713/322 |
| 2008/0019501 | A1 * | 1/2008 | Miller et al. .............. 379/412 |

\* cited by examiner

*Primary Examiner*—Ayaz R Sheikh
*Assistant Examiner*—Tarell Hampton

(57) ABSTRACT

This invention discloses an interface card built in each single unit of a CTI system and connected to the Voice Processing Unit (VPU) of the single unit via local CT-BUS. On the transmitting side of an interface card, low-speed signals from the VPU in the single unit are multiplexed into a single high-speed signal and converted into LVDS signals. On the receiving side of the interface card, external high-speed LVDS signals are converted into low voltage TTL signals, demultiplexed into local CT-BUS compatible low-speed signals and sent to the VPU in the single unit. The invention also discloses a CTI system applying the interface card. The interface card and the CTI system applying the interface card feature low cost, simple and reliable connection, easy installation and operation, high reliability, large channel capacity and good expandability.

6 Claims, 3 Drawing Sheets

INTERFACE CARD AND CTI SYSTEM APPLYING INTERFACE CARD

BACKGROUND OF THE INVENTION

The invention relates to value-added telecommunication services, to be more specific, an interface card and a CTI system applying interface cards.

Applications of Computer Telephony Integration (CTI), especially value-added telecommunication services, generally require the system to have a large channel capacity and sufficient expandability. Due to limited processing capabilities of single unit and requirement of system reliability, the overall CTI system usually has to be distributed in multiple chassis, which demands interconnection of the distributed chassis. In CTI application, interconnection of multiple computers is realized with interface card. There are three commonly used interface cards in the market: CT-BUS extension, ATM interface conversion and Ethernet interface conversion.

CT-BUS extension interface card enables interconnection of BUS between chassis by directly converting unipolar CT BUS signals in a CTI single unit into RS-485 signals. As CT BUS has a plurality of signal cables, there are a plurality of pairs of connection cables between chassis. All the chassis are actually connected to the same CT BUS, therefore the transmission distance has to be small (less than one meter) and the requirement for signals is very strict. It features complicated installation and usage, and low reliability.

ATM interface conversion interface card enables interconnection of multiple computers by merging and combining CT BUS data in a CTI single unit into ATM packets and switching to optical fiber transmission via ATM optical port. It features a long connection distance and good expandability. But its application is limited due to high cost and complicated usage.

Ethernet interface conversion interface card enables interconnection of multiple computers via Ethernet by packing CT BUS data to be switched in a CTI single unit with a specific Ethernet packet processor. It features simple usage, easy connection, a long connection distance and good expandability, only requiring a common twisted pair cable for interconnection. However, its cost per channel is high, which can lead to an extremely high cost when it comes to application of large channel capacity.

BRIEF SUMMARY OF THE INVENTION

The technical problem of be solved by this invention is to provide a low cost and high performance interface card and a CTI system applying such an interface card.

To solve the above technical problem, the technical solution of the invention is to provide an interface card built in each single unit of the CTI system and connected to the VPU of the single unit via the bus. On the transmitting side of the interface card, low-speed signals from the VPU in the single unit are multiplexed into a single high-speed signal and converted into LVDS signals. On the receiving side of the interface card, external high-speed LVDS signals are converted into low voltage TTL signals, demultiplexed into low-speed signals within the specification range of the local bus and sent to the signal processing unit of the CTI single unit.

The interface card includes a memory lock and buffer unit receiving serial code stream from the VPU of its hosting computer and defined as output of its hosting computer, and performing parallel/serial conversion and latch of the serial code stream. A special RAM (the master memory) for the code stream is connected behind the memory lock and buffer unit. The code stream can be memorized by the master memory, and the frame tag bytes for alignment are written into the specific memory locations on the master RAM. The code stream is read by a high-speed clock synchronized to the local BUS clock at the other port of the master RAM, sent to an LVDS drive connected to the master RAM after parallel/serial conversion and output as LVDS level signals.

The interface card also includes an LVDS receiver to receive LVDS level high-speed code stream, behind which a parallel/serial conversion and locking unit converting high-speed code stream into low-speed TTL level signals is connected. The parallel/serial conversion and locking unit is connected to a secondary RAM, which identities the start of frame based on identifying logic of the built-in frame synchronization byte signals and writes the low-speed TTL level signal sequence into the local secondary RAM. The low-speed TTL level signals are read with the low-speed clock sequence from the local BUS at the other port of the secondary RAM and sent to the local BUS. The interface card also includes a frequency divider which divides frequency of received clock signals to generate the low-speed reference clock signals. The reference clock signals are also input to the local BUS.

The interface card also includes a DIP switch for Enable setting of the interface card.

The invention also provides a CTI system applying the interface card, which includes at least two CTI single units, with each CTI unit has at least one interface card. Each interface card has an input and an output and is connected to the VPU on the CTI unit via the local BUS. Each interface card is cross connected to interface cards in another CTI single units via twisted pair cable. On the transmitting side of an interface card, low-speed signals from the VPU in the single unit are multiplexed into a single high-speed signal and converted into LVDS signals to the level port. On the receiving side of the interface card, external high-speed LVDS signals are converted into low voltage TTL signals, demultiplexed into local BUS compatible low-speed signals and sent to the VPU in the single unit.

The interface card includes a memory lock and buffer unit receiving serial code stream from the VPU of its hosting computer and defined as output of its hosting computer, and performing parallel/serial conversion and latch of the serial code stream. A special RAM (the master memory) for the code stream is connected behind the memory lock and buffer unit. The code stream can be memorized by the master memory, and the frame tag bytes for alignment are written into the specific memory locations on the master RAM. The code stream is read by a high-speed clock synchronized to the local BUS clock at the other port of the master RAM, sent to an LVDS drive connected to the master RAM after parallel/serial conversion and output as LVDS level signals.

The interface card also includes an LVDS receiver to receive LVDS level high-speed code stream, behind which a parallel/serial conversion and locking unit converting high-speed code stream into low-speed TTL level signals is connected. The parallel/serial conversion and locking unit is connected to a secondary RAM, which identifies the start of frame based on identifying logic of the built-in frame synchronization byte signals and writes the low-speed TTL level signal sequence into the local secondary RAM. The low-speed TTL level signals are read with the low-speed clock sequence from the local BUS at the other port of the secondary RAM and sent to the local BUS. The interface card also includes a frequency divider which divides frequency of received clock signals to generate the low-speed reference clock signals. The reference clock signals are also input to the local BUS.

The invention also provides a CTI system applying the interface card, which includes at least two CTI single units, with each CTI unit has at least one interface card. Each interface card has an input and an output and is connected to the VPU on the CTI unit via the local BUS, and each interface card is connected to the said switch with twisted pair cable. On the transmitting side of an interface card, low-speed signals from the VPU in the single unit are multiplexed into a single high-speed signal and converted into LVDS signals to the level port. On the receiving side of the interface card, external high-speed LVDS signals are converted into low voltage TTL signals, demultiplexed into local BUS compatible low-speed signals and sent to the VPU in the single unit.

The interface card includes a memory lock and buffer unit receiving serial code stream from the VPU of its hosting computer and defined as output of its hosting computer, and performing parallel/serial conversion and latch of the serial code stream. A special RAM (the master memory) for the code stream is connected behind the memory lock and buffer unit. The code stream can be memorized by the master memory, and the frame tag bytes for alignment are written into the specific memory locations on the master RAM. The code stream is read by a high-speed clock synchronized to the local BUS clock at the other port of the master RAM, sent to an LVDS drive connected to the master RAM after parallel/serial conversion and output as LVDS level signals.

The interface card also includes an LVDS receiver to receive LVDS level high-speed code stream, behind which a parallel/serial conversion and locking unit converting high-speed code stream into low-speed TTL level signals is connected. The parallel/serial conversion and locking unit is connected to a secondary RAM, which identifies the start of frame based on identifying logic of the built-in frame synchronization byte signals and writes the low-speed TTL level signal sequence into the local secondary RAM. The low-speed TTL level signals are read with the low-speed clock sequence from the local BUS at the other port of the secondary RAM and sent to the local BUS. The interface card also includes a frequency divider which divides frequency of received clock signals to generate the low-speed reference clock signals. The reference clock signals are also input to the local BUS.

The invention has the following benefits: the interface card and the CTI system applying the interface card feature low cost, interface card interconnection via simple and reliable twisted pair cable, over 10 meters connection distance, easy installation and operation, high reliability, large channel capacity and good expandability.

DETAILED DESCRIPTION OF THE INVENTION

Figure 1:
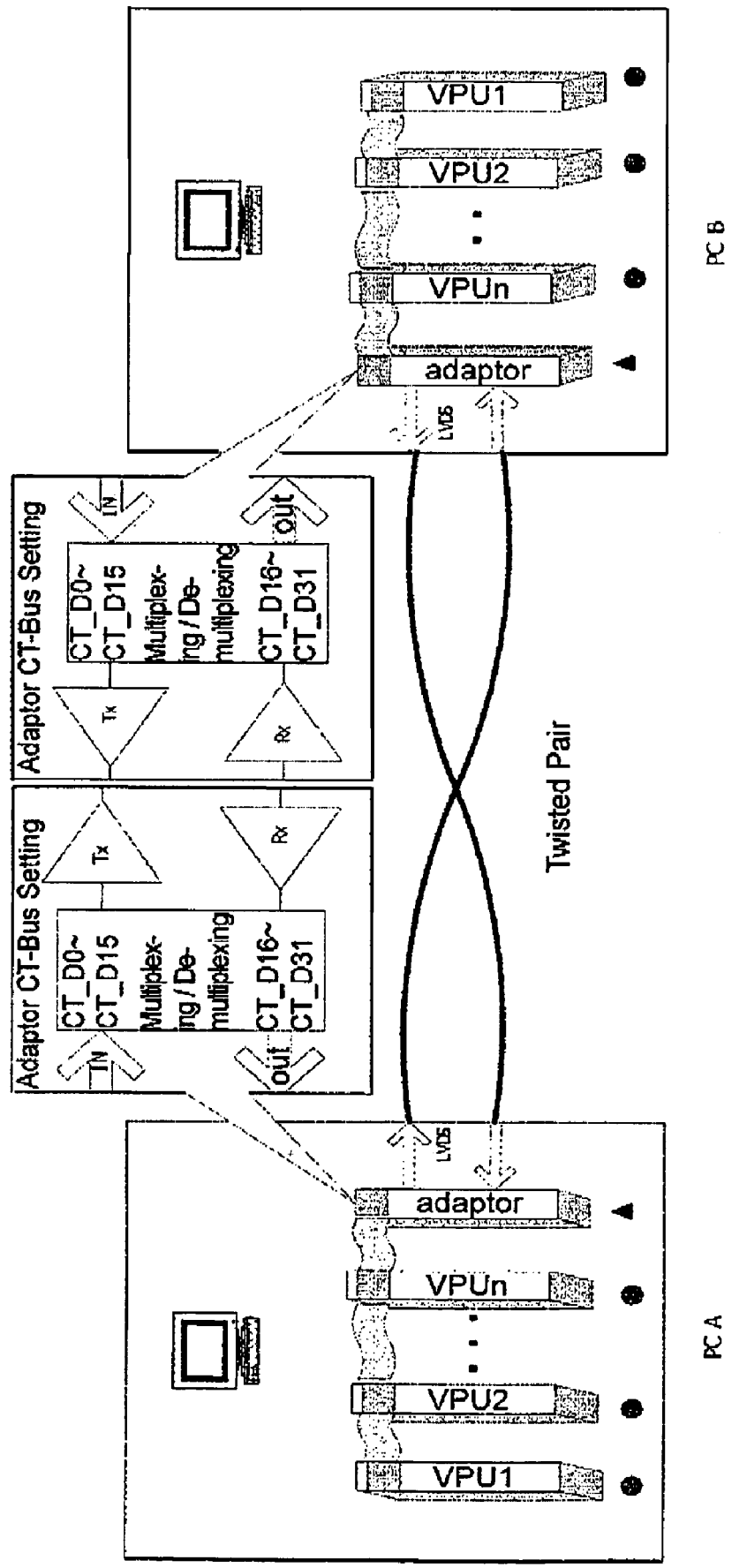
FIG. 1 is the diagram of the first embodiment of a CTI system applying the interface card.

FIG. 1 is the diagram of the first embodiment of a CTI system applying the interface card. The figure represents a small capacity CTI system, which includes only a few CTI single units (or referred to as PC). The figure represents PC A and PC B. Each of them has VPU (marked with a dot) and an interface card (marked with a triangle). The VPUs and the interface cards are interconnected via CT-BUS. Input and output directions of 32 8M code streams of CT-BUS are defined in each computer, wherein 16 8M code streams from CT_D0 to CT_D15 of CT-BUS are defined as output and 16 8M code streams from CT_D16 to CT_D31 are defined as input. Different PCs are cross connected via twisted pair cable to realize interconnection. As shown in FIG. 1, the output side (Tx) of PC A is connected to the input side (Rx) of PC B via a twisted pair cable and the input side (Rx) of PC A is connected to the output side (Tx) of PC B via another twisted pair cable, which enables communication between different PCs. FIG. 1 represents only two PCs. In other embodiments, multiple PCs (e.g. four) can be connected with such direct interconnection, which requires multiple interface cards (up to four) in a single unit and appropriate setting of the DIP switch.

Figure 2:
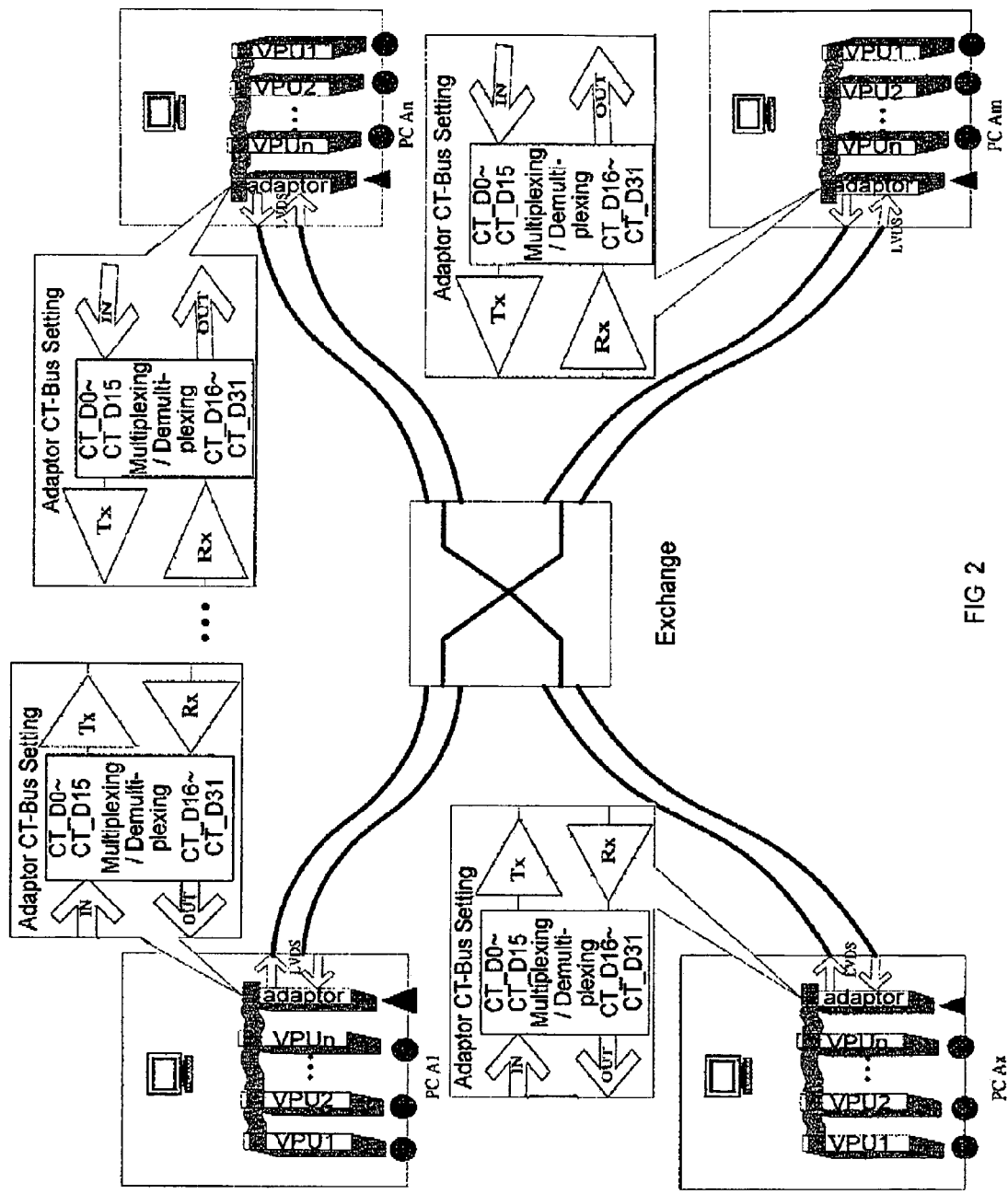
FIG. 2 is the diagram of the second embodiment of a CTI system applying the interface card.

FIG. 2 is the diagram of the second embodiment of a CTI system applying the interface card. This embodiment is primarily applied to large capacity systems, such as a 10000-line system. The actual capacity depends on the capacity of the switch in the figure. Four PCs (PC A1, PC Am, PC An and PC Ax) are shown in the figure, which is only for the purpose of illustration and does not constitute a limitation to this invention. Each PC has the same definition as those in FIG. 1. The interface card and the VPUs of each PC are interconnected via CT-BUS. The input side (Rx) and the output side (Tx) of the interface card in each PC are respectively connected to the switch via twisted pair cable. Technically, the interface card of each PC (e.g. PC A1) outputs 2K time slots of 16 8M code streams from CT_D0 to CT_D15 of its CT-BUS to the switch which interchanges such time slots with corresponding time slots of a corresponding PC (e.g. PC Am) and interchanges time slot data of the corresponding PC (PC Am) with corresponding time slots of code streams from CT_D16 to CT_D31 of PC A1. In this embodiment, a twisted pair for connection between PC and the switch is defined according to settings of the switch.

Figure 3:
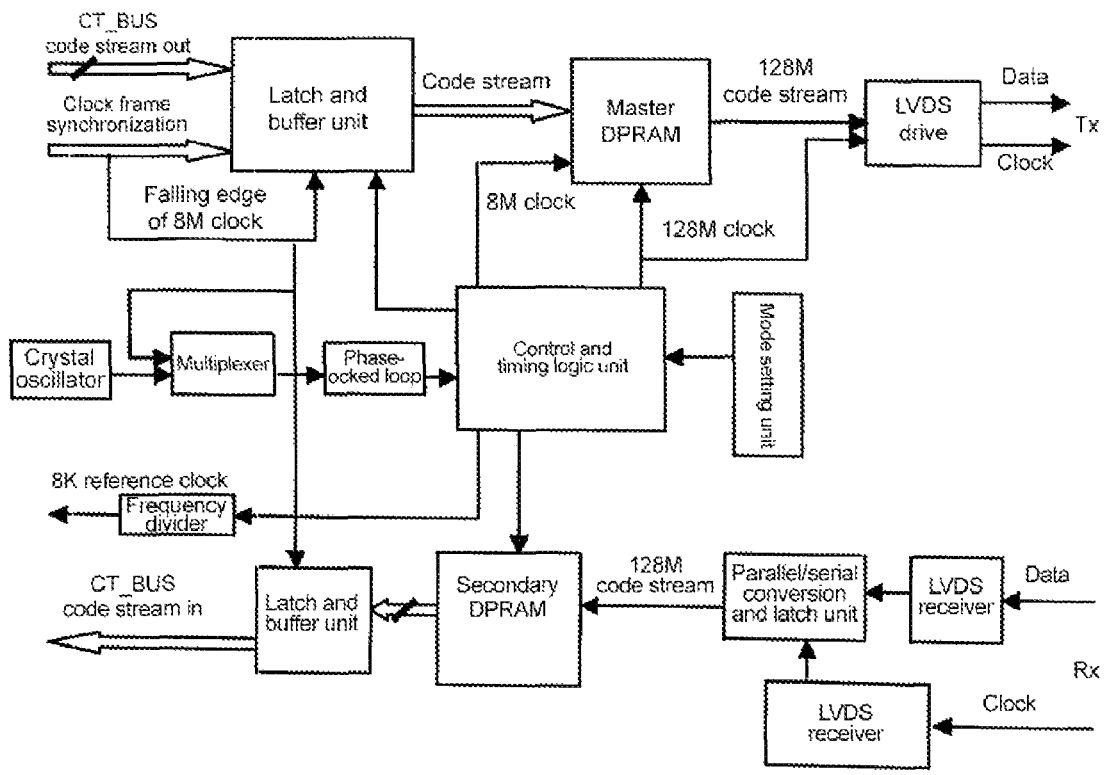
FIG. 3 is the schematic diagram of the interface card.

FIG. 3 is the schematic diagram of the interface card. The interface card of this invention works on the basis of fast transmission of Low Voltage Differential Signal (LVDS): low-speed signals on CT-BUS of the interface card's PC are multiplexed into a single high-speed signal on the transmitting side (Rx) of the interface card, then converted into and sent out as LVDS interface compatible signals. On the receiving side of the interface card, external high-speed LVDS signals are converted into low voltage TTL (LVTTL) signals, demultiplexed into local CT-BUS compatible low-speed signals and sent to the VPU of the PC for processing.

According to FIG. 3, the basic signal processing procedure is as follows: during sending processing, the interface card receives 16 serial 8M code streams (CT_D0 to CT_D15 of CT_BUS) from the VPU of its PC and defined as output of the PC, stores them on the master RAM (can be a DPRAM) as bytes after parallel/serial conversion and latch by the latch and buffer unit, and writes frame tag bytes for alignment at specific storage locations on the master RAM. On the other port of the master RAM, the data is read with the 128M clock synchronized to the local CT-BUS clock, forwarded after parallel/serial conversion, driven by LVDS drive and transmitted to the switch or other interface cards as LVDS level signals.

Similarly, during receiving processing, LVDS level 128 M data stream from the switch or other interface cards is received by the interface card with the synchronized 128 M clock, converted into LVTTL level signals by the LVDS receiver, and written into the local secondary RAM (e.g. DPRAM) in sequence after identification of the start of frame based on identifying logic of built-in frame synchronization byte signals. The data is read with the 8M clock sequence of local CT-BUS on the other port of the secondary RAM and sent to CT-BUS. The received clock signals are processed by the frequency divider to generate 8K clock signals which are transmitted to VPU via local CT-BUS. The DIP switch of the interface card is used to set Enable. For convenient usage, settings of the interface card can be enabled manually.

The interface card in the invention does not require software control. Users can easily put the interface card into use by presetting the DIP switch according to application purpose.

For example, the default application of the interface card said in the invention is to interconnect with the switch without any additional setting; in case of point-to-point application, i.e. connected to an interface card on another CTI unit, the logic relations like master/slave clock shall be set accordingly; in case of switching for less than 4K lines, no switch is needed and only ring networking mode is needs to be set. Attention, the default connection mode is the same as the point-to-point application, i.e. the master RJ45 of each point is connected to the slave RJ45 of the other point. Or, you may set the working mode of 16M code stream.

Read the following table for setting of the interface card (about the setting of code stream rate and that for outputting 8K reference clock)

TABLE 1

Setting of interface cards on a CTI unit

| DIP switch | Setting | Function | Remark |
|---|---|---|---|
| Position 1 of S3 | OFF (1) | Disable the transmission of received 8K clock to CT-BUS | Default setting made in manufacturing |
| | ON (0) | Enable the transmission of received 8K clock to CT-BUS | |
| Position 2 of S3 | OFF (1) | The code stream rate of the CT-BUS is 8 Mbps | Default setting made in manufacturing |
| | ON (0) | The code stream rate of the CT-BUS is 16 Mbps | |

In the applications of simple ring networking or simple point-to-point, multiple interface cards can be applied on a single CTI unit. The setting will be as per the following:

TABLE 2

Setting in case multiple interface cards are applied on a single CTI unit

| DIP switch | Setting: position 1 | Setting: position 2 | Function | Remark |
|---|---|---|---|---|
| S4 | OFF(0) | OFF(0) | The interface card outputs 16 code streams | Default setting made in manufacturing |
| | OFF(0) | ON(1) | The interface card outputs 12 code streams | |
| | ON(1) | OFF(0) | The interface card outputs 8 code streams | |
| | ON(1) | ON(1) | The interface card outputs 4 code streams | |
| S5 | OFF(0) | OFF(0) | The interface card starts the output from the code stream position 0 | Default setting made in manufacturing |
| | OFF(0) | ON(1) | The interface card starts the output from the code stream position 4 | Need to add default offset 16 |
| | ON(1) | OFF(0) | The interface card starts the output from the code stream position 8 | |
| | ON(1) | ON(1) | The interface card starts the output from the code stream position 12 | |

Among which, setting of DIP switch S5 depends on the S4 status: when S4=00, S5 totally outputs 16 code streams and has only 1 status available: S5 starts outputs from the code stream position 0, and any other setting is illegal. When S4=01, i.e. totally 12 code streams are output, then only two status can be optional for S5, i.e. output from code stream position 0 or 4.

Figure 4:
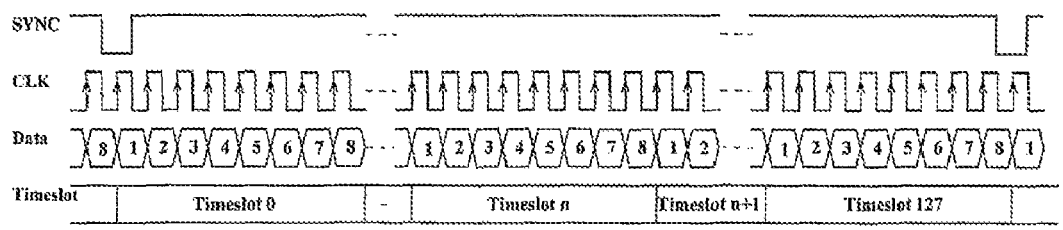
FIG. 4 is the data timing diagram of the interface card.

FIG. 4 illustrates the time sequence of the main data of the said interface card. The 16-digit data are sent to the upgoing edge of the first CLK upon the effecting of the frame synchronizer SYNC. all the data are locked at the CTx2000C by the upgoing edge synchronized with the clock, then saved after serial/parallel conversion, then, data saved at the 16 channels of DPRAM A are transmitted in corresponding sequence by the 128 Mbps high-speed clock. Therefore, the data are also transmitted at 128 Mbps in time slots one by one.

To simplify the connecting, the frame synchronization signal needed by the 128 Mbps clock is generated with a time slot of the 128 Mbps data stream, occupying CT0_TS0 or CT15_TS127 (in case of 8 Mbps code stream) or CT0_TS0 or CT7_TS255 (in case of 16 Mbps code stream).

The interface card and the CTI system applied by the invention feature simple connecting, even only one twisted pair is enough for data receiving and transmitting of all 2 Kbps time slot at minimum. Furthermore, the invention needs no software setting, the user can satisfy different application needs by setting only the DIP switch at the interface card, making the use easier. The structure adopts a FPGA design, allowing online internal logic updating to meet new application demands.

The invention claimed is:

1. An interface card built in a single unit of a computer telephony integration (CTI) system, the interface card being connected to a voice processing unit (VPU) of the single unit via a local CT-BUS;
   wherein 8 Mbps signals from the VPU in the CTI single unit are multiplexed into a single 128 Mbps signal, and converted into a low voltage differential signaling (LVDS) signal on a transmitting side of the interface card;
   wherein an external 128 Mbps LVDS signal is converted into transistor-transistor logic (TTL) signals and demultiplexed into 8 Mbps local CT-BUS compatible signals and sent to the VPU in the single unit on a receiving side of the interface card;

wherein a latch and buffer unit of the interface card is defined as output from its hosting computer, the latch and buffer unit receiving serial code stream from the VPU of its hosting computer, and performing parallel/serial conversion and latch of the serial code stream;

wherein a master RAM of the interface card comprises two ports, one port of the master RAM being connected behind the latch and buffer unit, frame tag bytes for alignment being written into a specific storage location of the master RAM, the code stream being read by a 128 Mbps clock synchronized to a local BUS clock at the other port of the master RAM, sent to an LVDS drive connected to the master RAM after parallel/serial conversion and output as an LVDS signal;

wherein the interface card further comprises an LVDS receiver, a secondary RAM, and a frequency divider, the LVDS receiver receiving 128 Mbps LVDS level code stream and is connected with a parallel/serial conversion and locking unit to convert the 128 Mbps LVDS level code stream into 8 Mbps TTL level signals, the secondary RAM comprising two ports, one port of the secondary RAM being connected to the parallel/serial conversion and locking unit, the secondary RAM identifying start of frame based on identifying logic of built-in frame synchronization byte signals and writing the 8 Mbps TTL level signal sequence into the secondary RAM, the code stream being read with the 8 Mbps clock sequence from a local BUS at the other port of the secondary RAM and sent to the local BUS, the frequency divider dividing frequencies of received clock signals to generate 8 Mbps reference clock signals, and the 8 Mbps reference clock signals being also input to the local BUS.

2. The interface card of claim 1, further comprising a dual inline package (DIP) switch for function setting at the interface card.

3. A CTI system comprising at least two CTI single units, each CTI single unit comprising at least one interface card, the interface card being one of the interface cards comprised with the CTI units and each comprising an input and an output and being connected to a VPU on the CTI single unit via a local CT-BUS, each interface card being cross-connected to another interface card of its destination CTI single unit via twisted pair cable;

wherein 8 Mbps signals from the VPU in the CTI single unit are multiplexed into a single 128 Mbps signal, and converted into an LVDS signal on a transmitting side of the interface card;

wherein an external 128 Mbps LVDS signal is converted into TTL signals and demultiplexed into 8 Mbps local CT-BUS compatible signals and sent to the VPU in the single unit on a receiving side of the interface card;

wherein a latch and buffer unit of the interface card is defined as output from its hosting computer, the latch and buffer unit receiving serial code stream from the VPU of its hosting computer, and performing parallel/serial conversion and latch of the serial code stream;

wherein a master RAM of the interface card comprises two ports, one port of the master RAM being connected behind the latch and buffer unit, frame tag bytes for alignment being written into a specific storage location of the master RAM, the code stream being read by a 128 Mbps clock synchronized to a local BUS clock at the other port of the master RAM, sent to an LVDS drive connected to the master RAM after parallel/serial conversion and output as an LVDS signal;

wherein the CTI system further comprises an LVDS receiver, a secondary RAM, and a frequency divider, the LVDS receiver receiving 128 Mbps LVDS level code stream and is connected with a parallel/serial conversion and locking unit to convert the 128 Mbps LVDS level code stream into 8 Mbps TTL level signals, the secondary RAM comprising two ports, one port of the secondary RAM being connected to the parallel/serial conversion and locking unit, the secondary RAM identifying start of frame based on identifying logic of built-in frame synchronization byte signals and writing the 8 Mbps TTL level signal sequence into the secondary RAM, the code stream being read with the 8 Mbps clock sequence from a local BUS at the other port of the secondary RAM and sent to the local BUS, the frequency divider dividing frequencies of received clock signals to generate 8 Mbps reference clock signals, and the 8 Mbps reference clock signals being also input to the local BUS.

4. The CTI system of claim 3, further comprising a DIP switch for function setting at the interface card.

5. A CTI system comprising at least two CTI single units and a switch, each CTI single unit comprising at least one interface card, the interface card being one of the interface cards comprised with the CTI units and each comprising an input and an output and being connected to a VPU on the CTI single unit via a local CT-BUS, each interface card being connected to the switch via a twisted pair cable;

wherein 8 Mbps signals from the VPU in the CTI single unit are multiplexed into a single 128 Mbps signal, and converted into an LVDS signal on a transmitting side of the interface card;

wherein an external 128 Mbps LVDS signal is converted into TTL signals and demultiplexed into 8 Mbps local CT-BUS compatible signals and sent to the VPU in the single unit on a receiving side of the interface card;

wherein a latch and buffer unit of the interface card is defined as output from its hosting computer, the latch and buffer unit receiving serial code stream from the VPU of its hosting computer, and performing parallel/serial conversion and latch of the serial code stream;

wherein a master RAM of the interface card comprises two ports, one port of the master RAM being connected behind the latch and buffer unit, frame tag bytes for alignment being written into a specific storage location of the master RAM, the code stream being read by a 128 Mbps clock synchronized to a local BUS clock at the other port of the master RAM, sent to an LVDS drive connected to the master RAM after parallel/serial conversion and output as an LVDS signal;

wherein the CTI system further comprises an LVDS receiver, a secondary RAM, and a frequency divider, the LVDS receiver receiving 128 Mbps LVDS level code stream and is connected with a parallel/serial conversion and locking unit to convert the 128 Mbps LVDS level code stream into 8 Mbps TIL level signals, the secondary RAM comprising two ports, one port of the secondary RAM being connected to the parallel/serial conversion and locking unit, the secondary RAM identifying start of frame based on identifying logic of built-in frame synchronization byte signals and writing the 8 Mbps TTL level signal sequence into the secondary RAM, the code stream being read with the 8 Mbps clock sequence from a local BUS at the other port of the secondary RAM and sent to the local BUS, the frequency divider dividing frequencies of received clock signals to generate 8 Mbps reference clock signals, and the 8 Mbps reference clock signals being also input to the local BUS.

6. The CTI system of claim 5, further comprising a DIP switch for function setting at the interface card.

* * * * *